US012380647B1

(12) United States Patent
Looper et al.

(10) Patent No.: US 12,380,647 B1
(45) Date of Patent: Aug. 5, 2025

(54) SYSTEMS AND METHODS FOR SPLATTING WITH ADAPTIVE DENSITY CONTROL

(71) Applicant: Illuscio, Inc., Culver City, CA (US)

(72) Inventors: Sean Looper, Flagstaff, AZ (US); Joseph Bogacz, Ontario (CA)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/913,595

(22) Filed: Oct. 11, 2024

(51) Int. Cl.
*G06T 17/20* (2006.01)
*G06T 13/20* (2011.01)
*G06T 15/08* (2011.01)
*G06T 15/20* (2011.01)

(52) U.S. Cl.
CPC .............. *G06T 17/20* (2013.01); *G06T 13/20* (2013.01); *G06T 15/08* (2013.01); *G06T 15/20* (2013.01); *G06T 2210/08* (2013.01); *G06T 2210/36* (2013.01); *G06T 2210/56* (2013.01)

(58) Field of Classification Search
CPC ... G06T 19/006; G06T 15/00; G06T 2210/36; G06F 3/012; G06F 3/013
See application file for complete search history.

(56) References Cited

U.S. PATENT DOCUMENTS

2021/0056762 A1* 2/2021 Robbe ................. G06F 16/2282
2021/0366194 A1* 11/2021 Han ........................ G06F 3/012
2022/0262079 A1* 8/2022 Croxford ................ G06T 15/20
2024/0069625 A1* 2/2024 Lal .......................... G06F 3/011
2024/0242449 A1* 7/2024 Ökvist .................... G06T 13/40

OTHER PUBLICATIONS

Kim, Hyeon-Joong, et al. "Adaptive surface splatting for facial rendering." Computer Animation and Virtual Worlds 23.3-4 (2012):363-373. (Year: 2012).*

Wilson, Andrew Thomas. Spatially encoded image-space simplifications for interactive walkthrough. The University of North Carolina at Chapel Hill, 2002. (Year: 2002).*

* cited by examiner

*Primary Examiner* — Ryan McCulley
(74) *Attorney, Agent, or Firm* — Ansari Katiraei LLP; Arman Katiraei; Sadiq Ansari

(57) ABSTRACT

A splat generation system and associated methods implement splatting with adaptive density control to generate a splat representation of a three-dimensional (3D) model in which the splat density and quality in regions of the 3D model that are prioritized based on creator intent or that are commonly or consistently in a user's field-of-view are increased relative to the splat density and quality in other regions of the 3D model. The system receives the different priorities associated with different parts of the 3D model based on the creator intent or tracked view paths. The system generates a first set of splats that represent the 3D model with a first fidelity, and generates a second set of splats at a greater second fidelity for a first subset of parts of the 3D model that have a higher priority than a second subset of parts of the 3D model.

16 Claims, 10 Drawing Sheets

SYSTEMS AND METHODS FOR SPLATTING WITH ADAPTIVE DENSITY CONTROL

BACKGROUND

Three-dimensional (3D) models are large files that require large amounts of compute power to generate, large amounts of bandwidth to distribute over a data network, and large amounts of rendering resources to visualize onscreen and interact with in a seamless and uninterrupted manner. Splatting (e.g., Gaussian splatting) is a technique for generating high-quality 3D models with less data relative to 3D models that are defined with meshes or points. However, significant compute power is required to generate the splats for a high-quality 3D model, and even 3D models that are defined solely with splats may have too much data for streaming and/or rendering when the splatting technique generates splats to uniformly represent all regions of the 3D model at the same level-of-quality. Accordingly, there is a need for optimizing splatting to reduce the compute power for training or generating 3D models, reduce the amount of bandwidth required to stream the splat 3D models, and reduce the rendering resources for presenting and interacting with the splat 3D models without reducing visual quality.

DETAILED DESCRIPTION OF PREFERRED EMBODIMENTS

Figure 1:
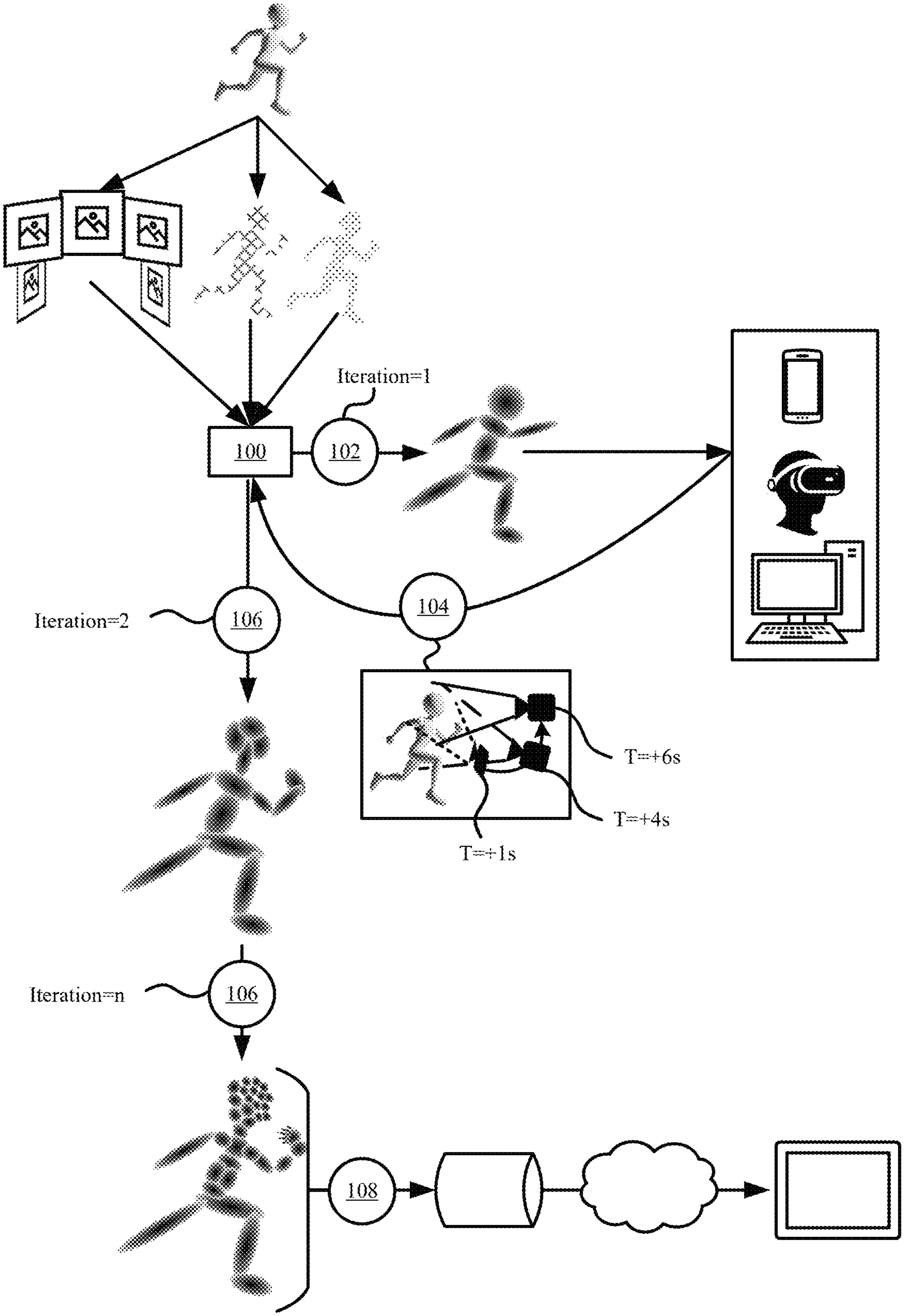
FIG. 1 illustrates an example of generating splats for a 3D model according to the adaptive density control of some embodiments presented herein.

The following detailed description refers to the accompanying drawings. The same reference numbers in different drawings may identify the same or similar elements.

Provided are systems and methods for splatting with adaptive density control. The adaptive density control increases the splat density and quality in regions of a three-dimensional (3D) model that are commonly or consistently in a user's field-of-view and decreases or leaves unchanged the splat density and quality in regions of the 3D model that are not commonly or consistently in a user's field-of-view. The adaptive density control produces high-quality splat representations for the commonly or consistently viewed regions of the 3D model and lower quality splat representations for the other regions of the 3D model. In other words, the adaptive density control generates splats with different densities across a 3D model according to tracked user viewing of the 3D model.

The adaptive density control reduces the compute power required to train or generate a splat 3D model by preventing an unnecessary generation of a uniform high-quality splat representation across all regions of the 3D model. The adaptive density control produces a splat 3D model with a reduced file size that is optimized for streaming across a data network and for faster rendering with less resources by a viewing device.

To determine the regions that are commonly or consistently viewed, a splat generation system tracks the paths by which different users view or render different 3D models. From the viewing paths, the splat generation system determines the regions that are in the field-of-view and the time that those regions remain in the field-of-view. The splat generation system analyzes the tracked viewing paths of different users for a particular 3D model over time to detect convergence about specific regions. The convergence may correspond to the average viewing path of the particular 3D model taken by the tracked users.

The splat generation system optimizes the generation of the splats for the particular 3D model based on the detected viewing path convergence. Optimizing the splat generation includes increasing the number and fidelity of the splats used to represent the regions that are located on or around the converged viewing path and to gradually decrease the number and fidelity of the splats used to represent the regions that are further removed from the converged viewing path.

In some embodiments, optimizing the splat generation includes performing a first iterative pass to generate splats that represent all regions of the particular 3D model at a uniform and/or low fidelity. The splats may be Gaussian splats generated from a Gaussian splatting technique or splats primitives that are generated from a radiance field, a neural network or deep learning modeling technique, photogrammetry, or other splat generation technique. In some such embodiments, the splat generation system performs additional iterative passes based on the converged viewing path to increase detail and fidelity to the regions based on their relative closeness to or distance from the converged viewing path. Specifically, the splat generation system retrains or refines the splat representations for the regions about the converged viewing path by generating more-and-more increasingly smaller sized and higher fidelity splats for the regions that are increasingly closer to the converged viewing path.

FIG. 1 illustrates an example of generating splats for a 3D model according to the adaptive density control of some embodiments presented herein. Splat generation system 100 generates (at 102) a splat representation of the 3D model at a uniform low fidelity from executing a first iteration of a splatting technique. In some embodiments, splat generation system 100 generates (at 102) the splat representation from a mesh model, point cloud, or other 3D encoding of the 3D model. In some such embodiments, generating (at 102) the splat representation may include replacing different sets of meshes or points from the 3D model with a splat.

Splat generation system 100 may use a Gaussian splatting technique, radiance field, neural network, deep learning model, photogrammetry, or other splat generation technique to generate (at 102) the splat. The splat is a 3D modeling primitive or volumetric primitive with a position and visual characteristics. The position may be defined with a coordinate in 3D space, a radius or shape, and/or a covariance. Accordingly, the splat may have an oval, ellipsoidal, or other shape that spans a region or volume of the 3D space. The visual characteristics of the splat may include opacity and/or color parameters or spherical harmonics.

Splat generation system 100 tracks (at 104) the converged viewing path of the 3D model. To track (at 104) the converged viewing path, splat generation system 100 may distribute the splat representation of the 3D model or the original encoding of the 3D model (e.g., mesh model or point cloud) to different client devices that request the 3D model from splat generation system 100. Splat generation system 100 may also provide a tracker to track the position and orientation of a virtual camera that is moved in a 3D space with the 3D model in order to determine the regions of the 3D model and the time that the regions remain in the field-of-view on each client device.

Splat generation system 100 performs (at 106) additional splat generation iterations for increasing fidelity of 3D model regions in the converged viewing path. In particular, splat generation system 100 generates splats at a greater fidelity than those generated during the initial iteration for the regions of the 3D model that are in the field-of-view along the converged viewing path. In some embodiments, generating the splats at the greater fidelity may include adding additional splats to represent those regions with more detail. In some embodiments, generating the splats at the greater fidelity includes replacing each previously generated splat with two or more smaller splats to better represent the shape or form of the 3D model in the region and to better represent the color or visual characteristics of the 3D model in the region by replacing the single color of a previously generated splat with varying colors across the two or more smaller splats. Performing (at 106) the additional splat generation includes performing additional splat generation passes to increase the fidelity for the regions of the 3D model that are closer to the center of the field-of-view along the converged viewing path and/or are closest to the converged viewing path. In other words, splat generation system 100 gradually increases the number of splats while reducing the size of the splats that are generated for the regions within the field-of-view of the converged view path based on the proximity of the regions to the converged view path.

Splat generation system 100 stores (at 108) the adaptive density controlled splat representation of the 3D model for distribution or streaming to client devices that subsequently request access to the 3D model. In some embodiments, splat generation system 100 stores (at 108) the adaptive density controlled splat representation of the 3D model that is generated after a threshold number of iterative splat generation passes are complete or the viewing paths of a threshold number of users have been aggregated and included in the derivation of the converged viewing path. In some embodiments, splat generation system 100 may store and/or stream the adaptive density controlled splat representation with however many number of splat generation iterations are complete to a requesting client device at the time the request is issued from that client device.

Figure 2:
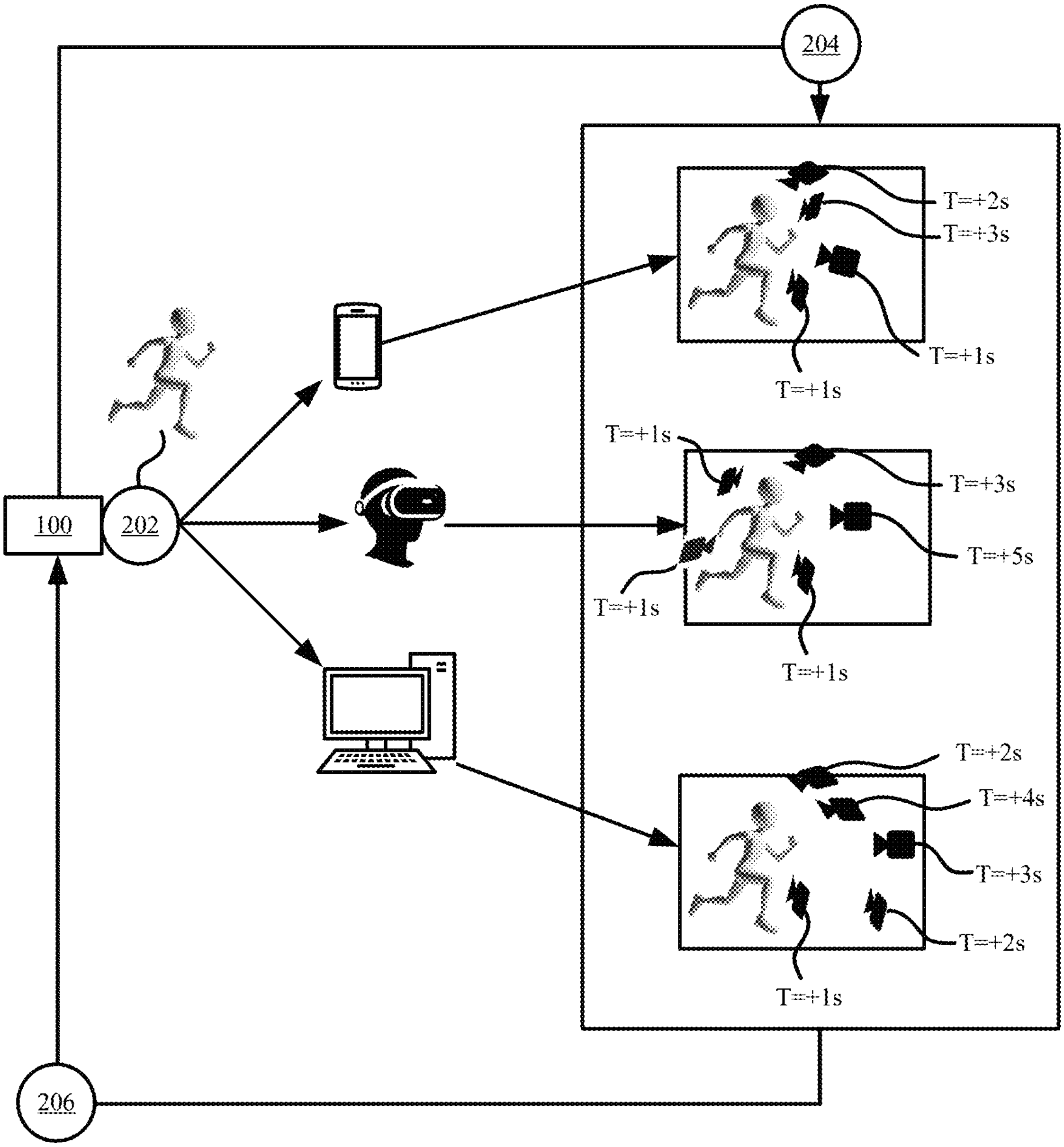
FIG. 2 illustrates an example of viewing path tracking in accordance with some embodiments presented herein.

FIG. 2 illustrates an example of the viewing path tracking in accordance with some embodiments presented herein. Splat generation system 100 distributes (at 202) a 3D model to different client devices that request access to the 3D model. The distributed (at 202) 3D model may be defined with meshes, points, splats, or primitives of another 3D format.

Splat generation system 100 tracks (at 204) the viewing path of the user associated with each client device. Specifically, the 3D model is presented in a 3D space from a render position. The render position is defined by the position and orientation of a virtual camera in the 3D space. The 3D model may be presented with the same initial or default view and/or the same initial or default virtual camera position and orientation. However, the user may move the virtual camera anywhere in the 3D space and may reorient the virtual camera to change the field-of-view at which the 3D model is presented. In some embodiments, splat generation system 100 tracks (at 204) the position and orientation of the virtual camera along with a time component that establishes the amount of time for each field-of-view established with the virtual camera at a particular position with a particular orientation. In some other embodiments, tracking (at 204) the viewing path includes generating priority values for different volumes or regions of the 3D model with the priority value for a given volume or region being based on the amount of time that the given volume or region is in the field-of-view and/or the proximity of the given volume or region to the field-of-view center.

Splat generation system 100 aggregates (at 206) the viewing paths that are tracked (at 204) each time the 3D model is requested and distributed to a client device. Splat generation system 100 may store or associate the aggregated (at 206) viewing paths of a 3D model with that 3D model. Splat generation system 100 may also store a timestamp with each viewing path to indicate the date and/or time when that viewing path was tracked. The timestamps may be used to bias the viewing paths when performing the viewing path convergence. For instance, more recent viewing paths may influence the converged viewing path more than older viewing path to account for changing viewing behaviors.

Figure 3:
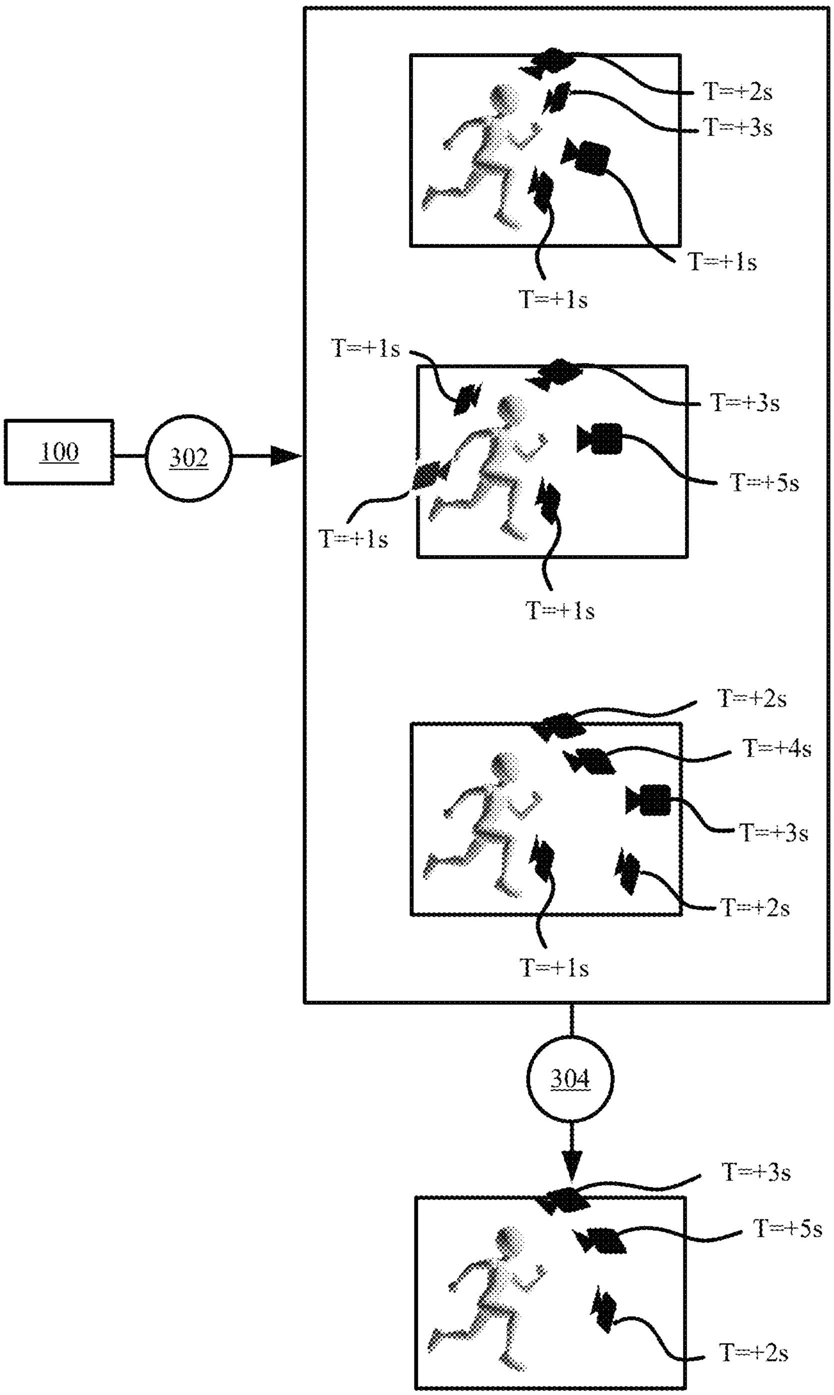
FIG. 3 illustrates an example of converging the viewing paths of a 3D model in accordance with some embodiments presented herein.

FIG. 3 illustrates an example of converging the viewing paths of a 3D model in accordance with some embodiments presented herein. Converging the viewing paths may include selecting (at 302) the individual user viewing paths that have been tracked and/or aggregated for a particular 3D model, evaluating the individual user viewing paths, and determining (at 304) a converged viewing path for the commonly or consistently viewing regions of the 3D model from the individual user viewing paths.

Determining (at 304) the converged viewing path may include determining the fields-of-view and/or virtual camera positions and orientations that are commonly and/or consistently found in the individual user viewing paths. In some embodiments, splat generation system 100 evaluates the individual user viewing paths to determine which fields-of-view and/or virtual camera positions and orientations reoccur with a threshold frequency or in a percentage (e.g., in at least 50%) of the individual user viewing paths, and defines the converged viewing path to include those fields-of-view and/or virtual camera positions and orientations. In some other embodiments, splat generation system 100 generates a heatmap for the parts, elements, or regions of the 3D model based on the frequency or total amount of time those parts, elements, or regions are viewable in the individual user viewing parts. For instance, the total amount of time that the 3D model is viewed across all tracked client devices is 10 minutes and the total amount of time that a first region of the 3D model is within the field-of-view of all individual user viewing paths is 1 minute, then splat generation system 100 may generate a heatmap with a value of 2 at a first position in the heatmap that maps to or is associated with the first region of the 3D model. If the total amount of time that a second region of the 3D model is within the field-of-view of all individual user viewing paths is 6 minutes, then splat generation system 100 may update the heatmap to have a value of 7 at a second position in the heatmap that maps to or is associated with the second region of the 3D model. If the total amount of time that a third region of the 3D model is within the field-of-view of all individual user viewing paths is 10 seconds, then splat generation system 100 may update the heatmap to have a value of 0 at a third position in the heatmap that maps to or is associated with the third region of the 3D model. The heatmap therefore differentiates between the regions, parts, or elements of the 3D model that are commonly or consistently viewed and other regions, parts, or elements that are less commonly or consistently viewed.

Since splats are view dependent, splat generation system 100 may generate two or more converged viewing paths from the tracked viewing paths of individual users. In particular, multiple splats may be defined in a 3D model for the same region, part, or element of the 3D model to realistically present the shapes, lighting, reflectivity, and colors of that region, part, or element from different angles or vantage points. Accordingly, a single field-of-view associated with a single converged viewing path may fail to present all the commonly or consistently viewed regions, parts, or elements from different angles or viewing perspectives. Rather than average all the viewing paths into a single converged viewing path or derive the single converged viewing path from the individual user viewing paths, splat generation system 100 determines different sets of tracked individual user viewing paths that present the commonly or consistently viewed parts or elements of the 3D model from different perspectives, angles, or sides, and generates different converged viewing paths based on the different sets of tracked individual user viewing paths. Consequently, each of the different converged viewing paths presents the 3D model from a different field-of-view, side, or perspective with a focus on different sets of important 3D model parts or elements in that field-of-view.

In some embodiments, the splat generation system performs the adaptive density control and splat generation based on creative intent rather than tracked viewing paths. In some such embodiments, the creator or an graphical artist associated with a 3D model may manually prioritize or specify the regions of the 3D model that should be generated at a greater fidelity and/or with a greater number of smaller-size splats than other less important regions. For instance, an original mesh or point cloud representation of a 3D model may be presented in an interactive interface. A user may select different regions or parts of the 3D model, and provide a priority value for each selected region or part. The priority value assigned to a selected region or part may be added to the meshes, points, or other 3D primitives in the selected region or part or may be associated to the 3D space spanned by the selected region or part in the 3D model metadata. The splat generation system may receive the priority values, and may modify the training or generation of the splats for the different regions or parts according to the assigned priority values. Specifically, the splat generation system may perform more splat generation iterations and define the loss function with a lower level of acceptable loss when generating the splats for regions or parts of the 3D model that are assigned a higher priority value, and may perform fewer splat generation iterations and define the loss function with a high level of acceptable loss when generating the splats for regions or parts of the 3D model that are a lower priority value.

Figure 4:
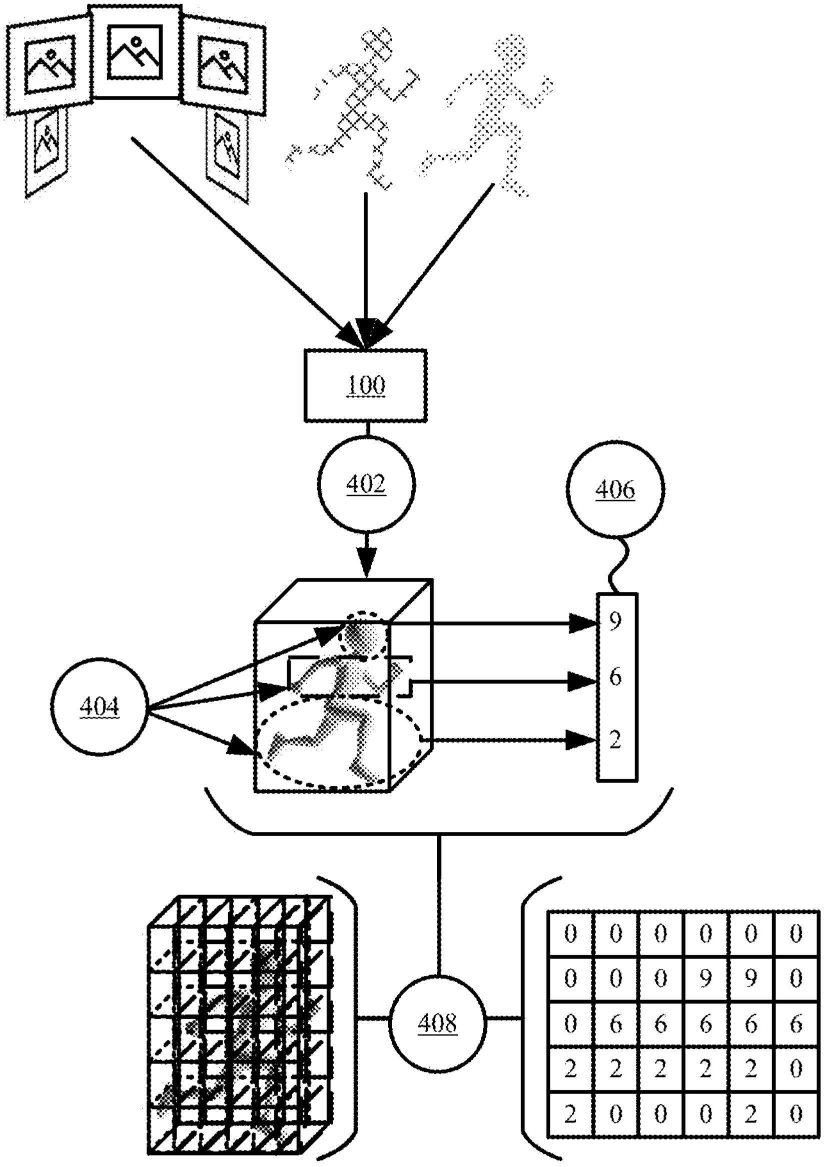
FIG. 4 illustrates an example of assigning priority values to a 3D model to modify operation of the splat generation system and/or training of the splat generation in accordance with some embodiments presented herein.

FIG. 4 illustrates an example of assigning priority values to a 3D model to modify operation of the splat generation system and/or training of the splat generation in accordance with some embodiments presented herein. Splat generation system 100 presents (at 402) a visualization of the 3D model in an interactive interface. For instance, splat generation system 100 renders the meshes or points of the 3D model in a 3D space.

Splat generation system 100 selects (at 404) different regions or parts of the 3D model in response to user input, and assigns (at 406) different priority values to each selected region or part based on additional user input that is provided after each region is selected (at 404). In some embodiments, splat generation system 100 assigns (at 406) the different priority values directly to the 3D primitives of the 3D model that are included in the selected region or part. In some other embodiments, splat generation system 100 generates (at 408) a heatmap and assigns (at 406) the different priority values to parts of the heatmap that correspond or map to the selected regions or parts of the 3D model with those values.

In some embodiments, artificial intelligence and/or machine learning (AI/ML) techniques may be used to automatically assign the priority values to different regions or parts of a 3D model as part of the adaptive density control. The AI/ML techniques may assign the priority values based on the positioning or placement of the 3D model in a larger 3D space or scene. For instance, the AI/ML techniques may assign lower priority values to 3D models in a background or periphery of a scene and greater priority values to 3D models in a foreground or center of a scene. The AI/ML techniques may also dynamically determine the importance of a 3D model based on a popularity measure derived from Internet traffic. The AI/ML techniques may perform object recognition or may classify the one or more objects that are represented in an original 3D model. The AI/ML techniques may determine a priority or importance associated with each object based on number of searches, social media mentions, and/or other measure of traffic associated with the object. Objects that are frequently searched or mentioned may be assigned higher priority values. Additionally, the AI/ML techniques may classify the object represented by a 3D model, search for images of the classified object, and prioritize the regions or parts of the 3D model that are frequently at the center or in the foreground of the searched for images.

Figure 5:
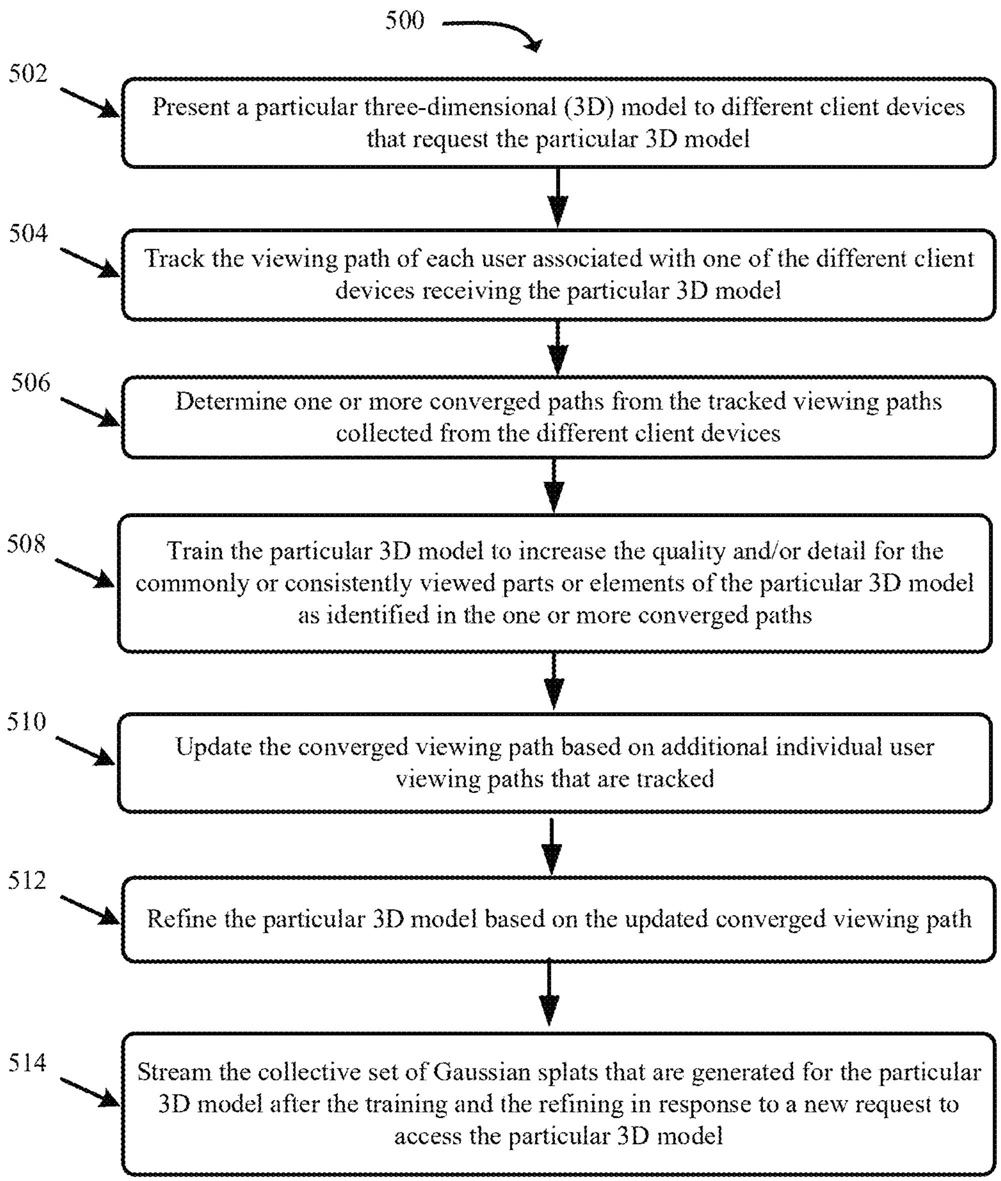
FIG. 5 presents a process for generating adaptive density controlled splats for a 3D model in accordance with some embodiments presented herein.

FIG. 5 presents a process 500 for generating adaptive density controlled splats for a 3D model in accordance with some embodiments presented herein. Process 500 is implemented by splat generation system 100. Splat generation system 100 includes one or more devices or machines with processor, memory, storage, network, and/or other hardware resources for the efficient generation of 3D models with splats of varying densities and/or quality.

Process 500 includes presenting (at 502) a particular 3D model to different client devices that request the particular 3D model from splat generation system 100 or an associated viewing or streaming service. For instance, splat generation system 100 may be part of a 3D video streaming service, a 3D video game streaming service, or a 3D spatial computing service, and may dynamically modify resolution and/or quality at different parts of the particular 3D model according to the adaptive density control in order to optimize the particular 3D model for streaming and/or rendering by generating the particular 3D model with a non-uniform distribution and/or a non-uniform quality of splats. The particular 3D model may be presented (at 502) as a mesh model with triangles, polygons, or other meshes, as a point cloud with a distributed set of disconnected points, or as one or more splat representations.

Process 500 includes tracking (at 504) the viewing path of each user associated with one of the different client devices receiving the particular 3D model. Tracking (at 504) the viewing path may include tracking the position and/or orientation of a virtual camera in the 3D space of the particular 3D model in order to determine the parts or elements of the particular 3D model that are in the field-of-view, the parts or elements at the center of the field-of-view or that are directed towards the virtual camera, and the amount of time that certain parts or elements are in the field-of-view or at the field-of-view center.

Process 500 includes determining (at 506) one or more converged paths from the tracked (at 504) viewing paths collected from the different client devices. The one or more converged paths identify the commonly or consistently viewed parts or elements of the particular 3D model and/or the common viewpoint or perspective at which those parts or elements are viewed. The commonly or consistently viewed parts or elements of the particular 3D model include the particular 3D model regions that receive a threshold amount of the total viewing time from the tracked (at 504) viewing paths or are in the field-of-view of a threshold number of the tracked (at 504) viewing paths. Accordingly, the commonly or consistently viewed parts or elements are the most viewed or most important parts or elements of the particular 3D model or are the parts or elements that receive the majority of the user focus or engagement.

Each converged path may be derived from two or more separate viewing paths, and may represent an average or weighted average of the two or more separate viewing paths. Different converged viewing paths may be defined for different sides or viewing perspectives of the particular 3D model. For instance, a first converged viewing path may be defined for the front facing parts or elements of the particular 3D model, a second converged viewing path may be defined for the right facing parts or elements of the particular 3D model, a third converged viewing path may be defined for the right facing parts or elements of the particular 3D model, and a fourth converged viewing path may be defined for the rear facing parts or elements of the particular 3D model.

In some embodiments, determining (at 506) the one or more converged paths includes generating a heatmap with a set of values that each map to a different region, part, or element of the particular 3D model. The set of values specify a priority or importance for the mapped region, part, or element represented by a specific value based on the number of times or the total amount of time that the mapped region, part, or element is in the field-of-view or at the center of the field-of-view in the tracked (at 504) viewing paths.

In some embodiments, different regions or parts of the particular 3D model may be assigned or associated with priority values to preserve the creative intent such that tracking (at 504) the viewing paths and determining (at 506) the converged paths may be unnecessary or not needed. In some such embodiments, the particular 3D model creator or a user may select and assign the priority values to different regions of the particular 3D model that they want preserved or represented at the greatest fidelity or that they want represented at progressively lower levels of fidelity. For instance, the user may select the head of a character that is represented in the particular 3D model and specify a high priority value to the head because of intricate detail that may have been added to the head or because the user wants viewers to focus on the head of the particular 3D model over other parts. The user may then select the legs of the character and specify a low priority value to the legs because of less or unimportant detail in the legs or because the user wants viewers to not focus on the legs of the character.

Process 500 includes training (at 508) the particular 3D model to increase the quality and/or detail for the commonly or consistently viewed parts or elements of the particular 3D model as identified in the one or more converged paths or user-specified priority values. Training (at 508) the particular 3D model includes generating an initial set of splats to represent the particular 3D model at a low resolution or low fidelity, and generating additional splats to define the commonly or consistently viewed parts or elements with more detail and more fidelity. The additional splats may replace or add to the existing splats that represent the commonly or consistently viewed parts or elements with lesser detail or at a lower quality. In some embodiments, splat generation system 100 may generate the additional splats to represent smaller-sized regions of the commonly or consistently viewed parts or elements. Accordingly, a region whose shape and color was represented by the single shape and single color of one splat may be represented by two or more smaller-sized splats that may form more accurate or detailed shapes that than the one splat and that may provide greater color variation across the region than the one splat.

In some embodiments, training (at 508) the particular 3D model involves performing multiple splat generation iterations. In some such embodiments, performing the multiple splat generation iterations includes executing a splatting technique to model the radiance of the scene or space represented by the particular 3D model with a first iteration specifying a low fidelity generation for the entire scene or space and with subsequently iterations specifying a progressively higher fidelity generation that targets specific regions within the scene or space. More specifically, with each iteration, splat generation system 100 refines fewer parts or elements of the particular 3D model according to increasing priorities associated with the fewer parts or elements in the converged viewing path. For instance, splat generation system 100 may perform a first iterative pass that adds a first number of splats of a first size that is smaller than a size of existing splats to every part or element of the particular 3D element within the field-of-view of the converged viewing path. Splat generation system 100 may then perform a second iterative pass to add a second number of splats of a second size that is smaller than the first size to the parts or elements of the particular 3D element at the center of the converged viewing path field-of-view, and a third iterative pass to add a third number of splats of a third size that is smaller than the second size to the parts or elements of the particular 3D element that remain at the center of the converged viewing path field-of-view for a threshold amount of time (e.g., more than 2 seconds). Consequently, the parts or elements of the particular 3D model not within the converged viewing path field-of-view are encoded or represented by splats of a first resolution or first fidelity, the parts or elements of the particular 3D model about the periphery of the converged viewing path field-of-view are encoded or represented by splats of a second resolution or second fidelity, the parts or elements of the particular 3D model about the center of the converged viewing path field-of-view for less than the threshold amount of time are encoded or represented by splats of a third resolution or third fidelity, and the parts or elements of the particular 3D model about the center of the converged viewing path field-of-view for more than the threshold amount of time are encoded or represented by splats of a fourth resolution or fourth fidelity, wherein the fourth resolution or fourth fidelity has the greatest structural and visual characteristic (e.g., color) variety and the first resolution or first fidelity has the least structural and visual characteristics variety for equally sized regions of the particular 3D model.

Process 500 includes updating (at 510) the converged viewing path based on additional individual user viewing paths that are tracked after training (at 508) the particular 3D model. In some embodiments, splat generation system 100 streams the particular 3D model as defined or represented by the splats of the splat generation iteration that was completed prior to receiving a client device request for the particular 3D model. In some other embodiments, splat generation system 100 streams the initial low fidelity splat representation of the particular 3D model until a specific number of splat generation iterations are complete or a threshold number of individual user viewing paths are tracked. Splat generation system continually updates (at 510) the converged viewing path to track changing user viewing behavior. For instance, when the particular 3D model is first released, users may focus on a first set of parts or elements of the particular 3D model. Over time, the popularity of the particular 3D model may change or the particular 3D model may be presented with other 3D models such that the user focus may shift to a second set of parts or elements of the particular 3D model.

Process 500 includes refining (at 512) the particular 3D model based on the updated (at 510) converged viewing path. Refining (at 512) the particular 3D model includes performing additional splat generation iterations to account for changes in the converged viewing path. Specifically, splat generation system 100 may increase fidelity and/or quality in parts or elements of the particular 3D model that move into the field-of-view or are closer to the field-of-view center of the converged viewing path as the converged viewing path is updated (at 510).

Process 500 includes streaming (at 514) the collective set of splats that are generated for the particular 3D model after the training (at 508) and the refining (at 512) in response to a new request to access the particular 3D model. The collective set of splats represent the particular 3D model with a non-uniform density of splats, different sized splats, and different quality or fidelity for different parts, elements, or regions of the particular 3D model. In particular, the commonly or consistently viewed parts or elements of the particular 3D model are represented at a greater fidelity and/or quality than lesser viewed parts or elements of the particular model by defining a different density of splats for the commonly or consistently viewed parts or elements than the lesser viewed parts or elements. Consequently, the total size of the particular 3D model is reduced without compromising or degrading quality at the commonly or consistently viewed parts or elements of the particular 3D model.

Figure 6:
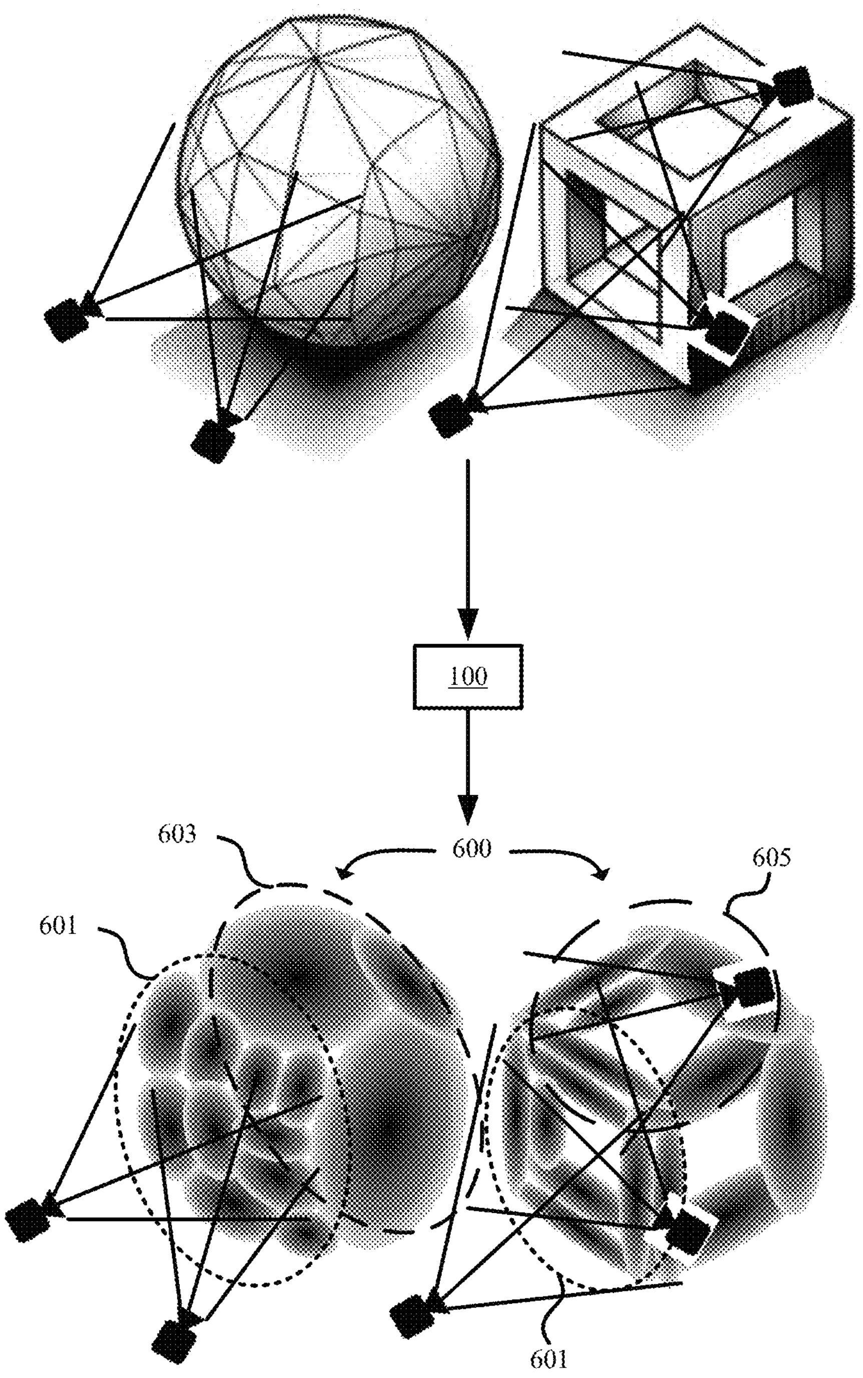
FIG. 6 illustrates an example of a 3D model that is generated from the adaptive density control training and refining of a 3D model based on one or more converged viewing paths in accordance with some embodiments presented herein.

FIG. 6 illustrates an example of a 3D model that is generated from the adaptive density control training and refining of 3D model 600 based on one or more converged viewing paths in accordance with some embodiments presented herein. 3D model 600 is a scene with two 3D objects. 3D model 600 includes regions of high fidelity 601, low fidelity 603, and varying intermediate levels of fidelity 605 that are defined according to the amount of time those regions remain in a field-of-view established by the one or more converged viewing paths and/or the proximity of those regions to the center of the field-of-view.

Regions of high fidelity 601 are defined or represented by a greater number of splats than the other regions. Moreover, the splats representing the regions of high fidelity 601 may be smaller in size and/or have a greater variety of forms, shapes, and/or colors for an equally sized region represented by intermediate regions 605 or low fidelity regions 603.

In some embodiments, a particular part, element, or region of the 3D model may be represented by different sets of high fidelity and low fidelity splats. In some such embodiments, the particular part, element, or region may fall within the converged viewing path field-of-view from a first perspective, angle, or position and outside the converged viewing path field-of-view from a second perspective, angle, or position. Since the splats may be view-specific, splat generation system 100 may generate a first number of high fidelity splats that are rendered or become visible when viewing the particular part, element, or region from the first perspective, angle, or position and a second number of low fidelity splats that are rendered or become visible when viewing the particular, element, or region from the second perspective, angle, or position.

Splat generation system 100 may apply the adaptive density control to 3D animations or animations of a 3D model. In particular, the 3D model may be animated such that the shape, form, and/or visual appearance of the 3D model changes over time. Each user may view each frame of the 3D animation from a different perspective, angle, or vantage point. Splat generation system 100 may track the viewing path in each frame by individual users in order to train or refine each frame of the 3D animation to increase fidelity or detail at the parts or elements of the 3D model in each frame of the 3D animation that are commonly or consistently in the field-of-view and to decrease or retain fidelity or detail at the other parts or elements of the 3D model in each frame of the 3D animation that are not commonly or consistently in the field-of-view. The application of the adaptive density control to 3D animations or animations of a 3D model greatly reduces the compute power required to generate the splat representations for each frame of the 3D animation, and greatly reduces the size of the 3D animation without significant degradation to the quality or detail of the 3D animation as different parts or elements of the 3D model come into and out of the field-of-view over the course of the 3D animation.

Figure 7:
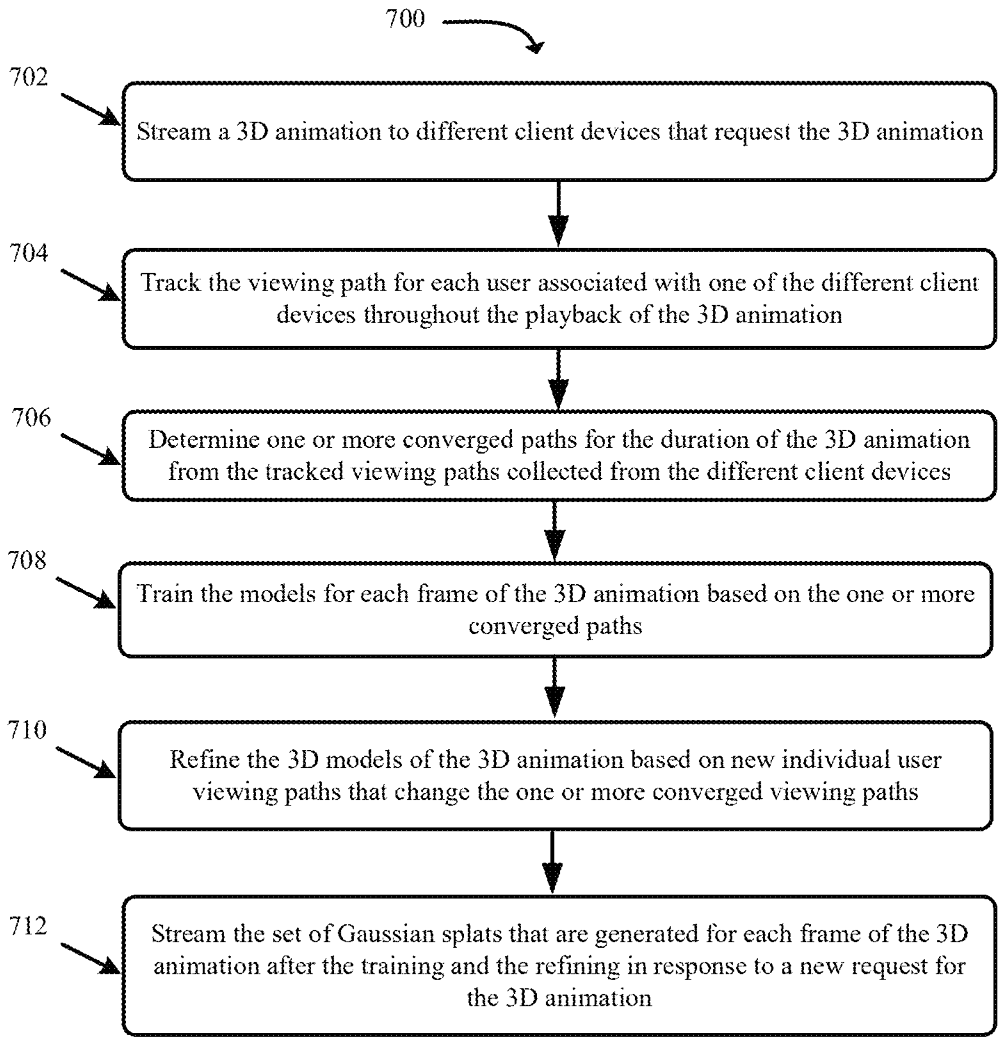
FIG. 7 presents a process for applying the adaptive density control to a 3D animation in accordance with some embodiments presented herein.

FIG. 7 presents a process 700 for applying the adaptive density control to a 3D animation in accordance with some embodiments presented herein. Process 700 is implemented by splat generation system 100.

Process 700 includes streaming (at 702) a 3D animation to different client devices that request the 3D animation from splat generation system 100 or an associated 3D streaming service. The 3D animation may include a 3D model or a 3D space or scene with one or more 3D models that are animated according to a linear, deterministic, or programmed sets of transformations or movements that occur at different times of the 3D animation. The 3D animation may be presented from an initial or default viewpoint or virtual camera position. However, each user has the freedom to change the virtual camera position at any time during the 3D animation in order to change the field-of-view for any frame of the 3D animation.

Process 700 includes tracking (at 704) the viewing path for each user associated with one of the different client devices throughout the playback of the 3D animation. Tracking (at 704) the viewing path for the 3D animation includes determining the field-of-view or the position and orientation of the virtual camera for each frame of the 3D animation. Since the 3D model structure or coloring that is represented by a particular part or element may change in each frame of the 3D animation, splat generation system 100 may treat the same part or element of the 3D model in each frame of the 3D animation as different parts or elements that are temporally linked to a different frame of the animation.

Process 700 includes determining (at 706) one or more converged paths for the duration of the 3D animation from the tracked viewing paths collected from the different client devices. The one or more converged paths identify the commonly or consistently viewed parts or elements of the animated 3D model in each frame of the 3D animation.

In some embodiments, the one or more converged paths correspond to heatmaps that are defined for each frame of the 3D animation. Each heatmap includes a set of values that map to different parts, elements, or regions of the 3D model as structured and colored in a particular frame of the 3D animation. The set of values represent the commonality or consistency with which the different parts, elements, or regions of the 3D model in the particular frame of the 3D animation were viewed by the individual users. For instance, a first part of the 3D model that is presented in the particular frame of the 3D animation and that is detected to be in the viewing path of a threshold number of users may receive a greater first value than a second part of the 3D model that is presented in the particular frame of the 3D animation and that is not detected to be in the viewing path of the threshold number of users.

Process 700 includes training (at 708) the models for each frame of the 3D animation based on the one or more converged paths. Here again, the training (at 708) of the models for each frame may be performed across multiple iterative passes. Each iterative pass may include generating splats on a per frame basis to increase the fidelity and/or quality for the parts or elements of the 3D model in a given frame of the 3D animation that are commonly or consistently in the field-of-view of the one or more converged paths for that given frame. Accordingly, splat generation system 100 selects a frame of the 3D animation to enhance, determines, from the one or more converged viewing paths, the parts or elements of the 3D model from the 3D animation that are commonly or consistently viewed in the selected frame, and generates the higher fidelity or more detailed splats for those parts or elements of the 3D model based on one or more of the parts or elements being in the converged viewing path field-of-view for the selected frame and their proximity to the center of the field-of-view at the selected frame. Splat generation system 100 completes an iterative pass once the different sets of parts or elements of the 3D model that are commonly or consistently viewed in different frames of the 3D animation have been enhanced with more and/or smaller-sized splats that better reproduce the variation in the structures, forms, or visual characteristics for the different sets of parts or elements.

Process 700 includes refining (at 710) the 3D models of the 3D animation based on new individual user viewing paths that change the one or more converged viewing paths. Splat generation system 100 may continually update the 3D animation and perform targeted splatting for different parts or elements of the 3D model in different frames of the 3D animation based on changing viewing behavior.

Process 700 includes streaming (at 712) the set of splats that are generated for each frame of the 3D animation after the training (at 708) and the refining (at 710) in response to a new request for the 3D animation. The fidelity and detail of the 3D model changes throughout the 3D animation to match the expected user focus on different parts or elements of the 3D model in different frames of the 3D animation.

Figure 8:
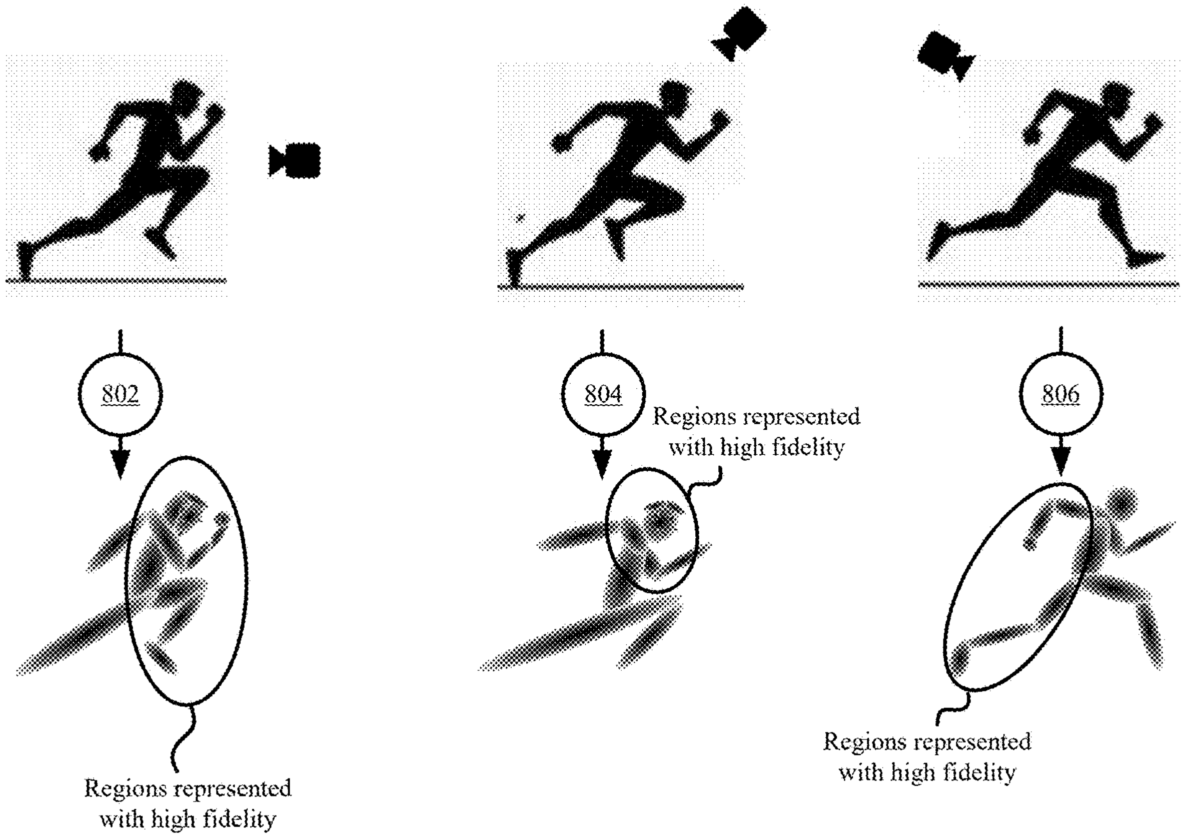
FIG. 8 illustrates an example of a 3D animation that is generated from the adaptive density control training and refining of an animated 3D model in accordance with some embodiments presented herein.

FIG. 8 illustrates an example of a 3D animation that is generated from the adaptive density control training and refining of an animated 3D model in accordance with some embodiments presented herein. The 3D animation is defined with several frames that gradually change the structure, positioning, and/or coloring of the 3D model. The converged viewing path also changes from frame-to-frame such that different regions, parts, or elements, of the 3D model are commonly or consistently viewed in the different frames. Accordingly, splat generation system 100 generates (at 802) splats for the first frame of the 3D animation to prioritize or represent a first set of regions or parts of the 3D model at a higher fidelity than other regions or parts of the 3D model based on a first virtual camera position and orientation for the first frame in the converged viewing path. Splat generation system 100 generates (at 804) splats for the second frame of the 3D animation to prioritize or represent a second set of regions or parts of the 3D model at a higher fidelity than other regions or parts of the 3D model based on a second virtual camera position and orientation for the second frame in the converged viewing path, and generates (at 806) splats for the third frame of the 3D animation to prioritize or represent a third set of regions or parts of the 3D model at a higher fidelity than other regions or parts of the 3D model based on a third virtual camera position and orientation for the third frame in the converged viewing path. Accordingly, different regions, parts, or elements of the 3D model are generated with different fidelities in different frames of the animation based on tracked changing user focus between the different frames.

Splat generation system 100 may apply the adaptive density control techniques for splats to primitives of other 3D formats. For instance, the adaptive density control may be used to generate a point cloud with different point densities and points of different sizes in order to increase detail and fidelity for regions of the point cloud that are commonly or consistently viewed and to reduce data for regions of the point cloud that are not commonly or consistently viewed as determined from a converged viewing path that is derived from tracking individual user viewing paths within the point cloud. More specifically, splat generation system 100 may track the parts or elements of a 3D model that are commonly or consistently viewed by different users, may generate a converged view path for the 3D model, may generate a low fidelity point cloud representation of the 3D model, and may perform iterations that add more points and points with smaller radii to represent the commonly or concisely viewed parts or elements with greater structural and color variation than the points from the original low fidelity representation.

Figure 9:
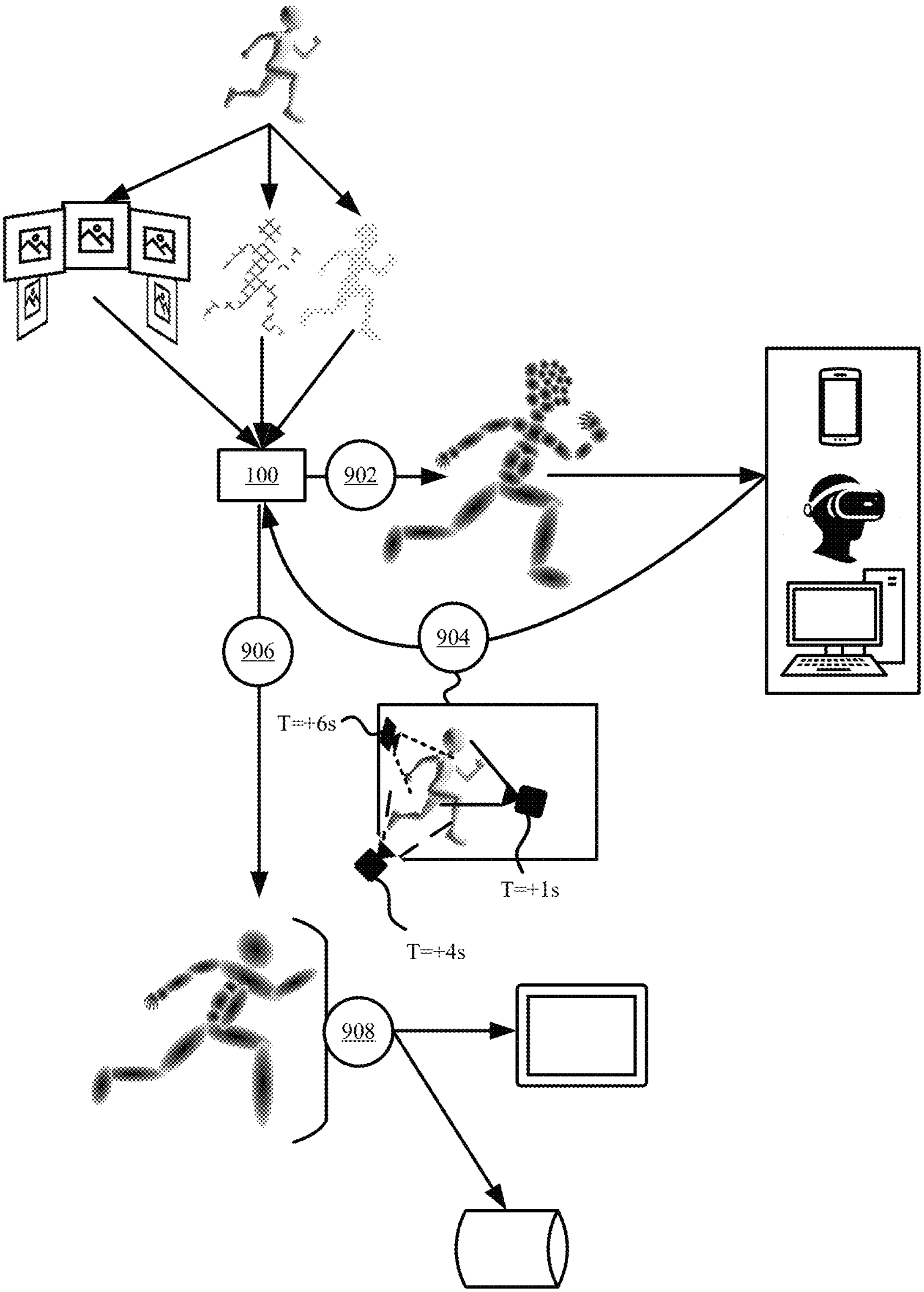
FIG. 9 illustrates an example of reversing the adaptive density control for splatting in accordance with some embodiments presented herein.

In some embodiments, splat generation system 100 reverses the adaptive density control operations to begin with a high fidelity representation of a 3D model and to perform iterative passes to remove fidelity and/or reduce the quality of the splats representing parts or elements of the 3D model that are not commonly or consistently viewed or in the converged viewing path. FIG. 9 illustrates an example of reversing the adaptive density control for splatting in accordance with some embodiments presented herein.

Splat generation system 100 generates (at 902) a high fidelity representation of a 3D model. Generating (at 902) the high fidelity representation includes generating the splat representation of the 3D model at the highest quality setting or with a first set of splats that match with a minimal amount of loss (e.g., less than 5% quality loss) to an original mesh or point encoding of the 3D model or original 2D image of a represented object.

Splat generation system 100 streams the 3D model to different client devices. The 3D model may be defined as a connected set of meshes, a disconnected set of points, or the high fidelity splat representation of the 3D model.

Splat generation system 100 tracks the viewing path that different users take within the 3D space of the 3D model. Splat generation system 100 determines (at 904) a converged viewing path for the 3D model based on the tracked viewing paths of the individual users.

Splat generation system 100 trains (at 906) the 3D model to decrease the quality and/or detail for the parts or elements of the particular 3D model that are not within the field-of-view of the converged viewing path and/or that are not at the center of the converged viewing path field-of-view. Training (at 906) the 3D model includes replacing the set of two or more splats representing a not commonly or consistently viewed part or element of the 3D model with a single lower fidelity splat. For instance, a particular element of the 3D model may be represented by 10 splats. The 10 splats accurately recreate variances in the shape and the visual characteristics (e.g., colors) of the particular element. Splat generation system 100 determines that the particular element does not fall within the field-of-view of the converged viewing path and is not a commonly or consistently viewed element of the 3D model. Accordingly, splat generation system 100 generates a single splat that best approximates the shape created by the 10 splat with a color that is derived from the different colors defined for each of the 10 splats. Additional reductive passes may be performed the further the particular element is from the converged viewing path field-of-view or based on the total distance between the particular element and each position defined for the converged viewing path. In other words, a single reductive iteration may be performed to replace the 10 splats with 4 splats if the particular element is just outside the field-of-view or is in the field-of-view for one part of the converged viewing path, and two reductive iterations may be performed to replace the 10 splats with 4 splats and the 4 splats with 1 splats if the particular element is a threshold distance outside the field-of-view or remains outside the field-of-view for the entirety of the converged viewing path.

Splat generation system 100 streams (at 908) the reduced splat representation of the 3D model in response to a subsequent request for the 3D model and/or once a threshold number of individual user viewing paths has been tracked for the 3D model. Additionally, splat generation system 100 may store the reduce splat representation for subsequent distribution or for further refinement should the converged viewing path change with the tracking of additional individual user viewing paths.

Figure 10:
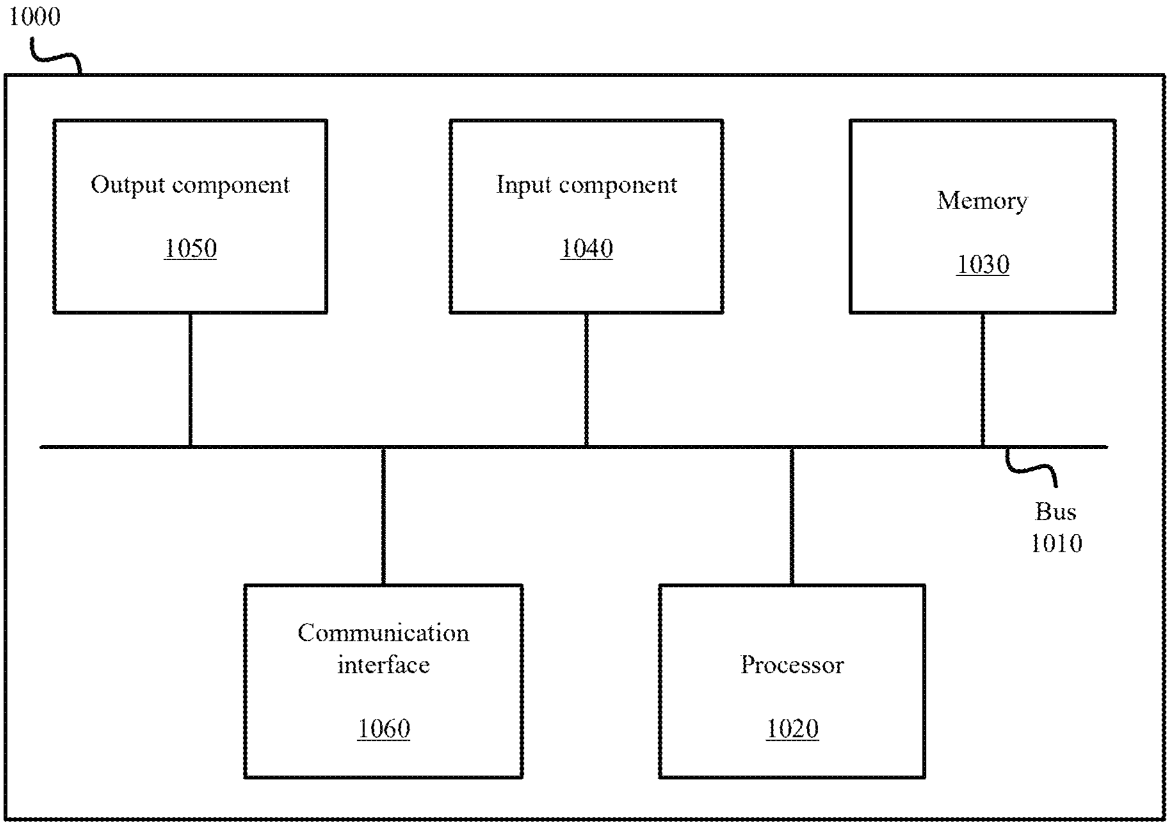
FIG. 10 illustrates example components of one or more devices, according to one or more embodiments described herein.

FIG. 10 is a diagram of example components of device 1000. Device 1000 may be used to implement one or more of the tools, devices, or systems described above (e.g., splat generation system 100, the client devices, etc.). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more LEDs, etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:

presenting a three-dimensional (3D) model to a plurality of client devices;

tracking a path with which each client device of the plurality of client devices views the 3D model;

setting different priorities based on a first subset of different parts of the 3D model being viewed by more client devices and for longer durations than a second subset of the different parts of the 3D model in the path tracked for each client device of the plurality of client devices;

determining a third subset of the different parts that are in a field-of-view tracked for the plurality of client devices for a first amount of time, and a fourth subset of the different parts that are in the field-of-view tracked for the plurality of client devices for a second amount of time that is greater than the first amount of time;

generating a first set of splats that represent the 3D model with a first fidelity, wherein generating the first set of splats comprises:

defining a loss function with a first amount of loss prior to generating the first set of splats; and determining that the first set of splats generated according to the loss function with the first amount of loss represents an original encoding of the 3D model with the first amount of loss;

generating a second set of splats for the first subset of the different parts of the 3D model that have higher priorities than the second subset of the different parts of the 3D model, wherein the second set of splats represent the first subset of parts at a second fidelity that is greater than the first fidelity, and wherein generating the second set of splats comprises:

changing the first amount of loss defined for the loss function to a second amount of loss that is less than the first amount of loss prior to generating the second set of splats; and determining that the second set of splats generated with the loss function defined with the second amount of loss represents the first subset of the different parts in the original encoding of the 3D model with the second amount of loss;

performing a first iterative pass that generates a third set of splats to represent the third subset of the different parts and the fourth subset of the different parts at the second fidelity;

performing a second iterative pass that generates a fourth set of splats to represent the fourth subset of the different parts at a third fidelity that is greater than the second fidelity; and presenting the first set of splats and the second set of splats in response to a request for the 3D model.

2. The method of claim 1 further comprising:

deriving a converged viewing path from the path tracked for each client device of the plurality of client devices, wherein deriving the converged viewing path comprises:

analyzing the path tracked for each client device of the plurality of client devices; and determining that the first subset of the different parts are in a field-of-view of a threshold number of the paths or are in the field-of-view for a percentage of time.

3. The method of claim 1 further comprising:

tracking a number of times that each region or part of the 3D model is in a field-of-view about the path with which each client device views the 3D model; and setting the higher priorities for the first subset of the different parts of the 3D model based on the number of times that each region or part from the first subset of the different parts is in the field-of-view.

4. The method of claim 1 further comprising:

tracking a total amount of time that each region or part of the 3D model is in a field-of-view about the path with which each client device views the 3D model; and setting the higher priorities for the first subset of the different parts of the 3D model based on the total amount of time that each region or part from the first subset of the different parts is in the field-of-view.

5. The method of claim 1, wherein generating the second set of splats further comprises:

increasing a fidelity at which the first subset of the different parts are represented based on an aggregate amount of time the first subset of the different parts are in a field-of-view established along the path with which each client device views the 3D model.

6. The method of claim 1, wherein tracking the path comprises:

determining different positions and orientations for a virtual camera along the path tracked for each client device of the plurality of client devices, wherein the different positions and orientations for the virtual camera establish different field-of-views from which different regions or parts of the 3D model are visible.

7. The method of claim 1, wherein generating the second set of splats further comprises:

increasing a detail and quality at which the first subset of the different parts of the 3D model are represented based on a distance that each of the first subset of the different parts of the 3D model is from a center of a field-of-view established along a converged viewing path that is derived from the path tracked for each client device of the plurality of client devices.

8. The method of claim 1 further comprising:

detecting selections of the different parts of the 3D model; and assigning a priority to each selected part of the 3D model in response to a user input.

9. The method of claim 1 further comprising assigning the different priorities to the different parts according to values that represent a creator intent.

10. The method of claim 1, wherein the second set of splats represent the first subset of parts with a greater number of splats than the first set of splats and with greater structure and color variety than the first set of splats.

11. The method of claim 1 further comprising:

storing the first set of splats and the second set of splats as a varying fidelity representation of the 3D model.

12. The method of claim 1 further comprising:

replacing a subset of splats from the first set of splats that represent the first subset of the different parts of the 3D model at the first fidelity with the second set of splats, wherein the second set of splats comprises a greater number of splats than the subset of splats.

13. The method of claim 1, wherein the 3D model is defined using meshes or points, and wherein presenting the first set of splats and the second set of splats comprises:

providing a splat representation of the 3D model defined using the first set of splats and the second set of splats instead of the meshes or the points of the 3D model in response to the request for the 3D model.

14. A splat generation system comprising:

one or more hardware processors configured to:

present a three-dimensional (3D) model to a plurality of client devices;

track a path with which each client device of the plurality of client devices views the 3D model;

set different priorities based on a first subset of different parts of the 3D model being viewed by more client devices and for longer durations than a second subset of the different parts of the 3D model in the path tracked for each client device of the plurality of client devices;

determine a third subset of the different parts that are in a field-of-view tracked for the plurality of client devices for a first amount of time, and a fourth subset of the different parts that are in the field-of-view tracked for the plurality of client devices for a second amount of time that is greater than the first amount of time;

generate a first set of splats that represent the 3D model with a first fidelity, wherein generating the first set of splats comprises:

defining a loss function with a first amount of loss prior to generating the first set of splats; and determining that the first set of splats generated according to the loss function with the first amount of loss represents an original encoding of the 3D model with the first amount of loss;

generate a second set of splats for the first subset of the different parts of the 3D model that have higher priorities than the second subset of the different parts of the 3D model, wherein the second set of splats represent the first subset of parts at a second fidelity that is greater than the first fidelity, and wherein generating the second set of splats comprises:

changing the first amount of loss defined for the loss function to a second amount of loss that is less than the first amount of loss prior to generating the second set of splats; and determining that the second set of splats generated with the loss function defined with the second amount of loss represents the first subset of the different parts in the original encoding of the 3D model with the second amount of loss; and perform a first iterative pass that generates a third set of splats to represent the third subset of the different parts and the fourth subset of the different parts at the second fidelity;

perform a second iterative pass that generates a fourth set of splats to represent the fourth subset of the different parts at a third fidelity that is greater than the second fidelity; and present the first set of splats and the second set of splats in response to a request for the 3D model.

15. The splat generation system of claim 14, wherein the one or more hardware processors are further configured to:

derive a converged viewing path from the path tracked for each client device of the plurality of client devices, wherein deriving the converged viewing path comprises:

analyzing the path tracked for each client device of the plurality of client devices; and determining that the first subset of the different parts are in a field-of-view of a threshold number of the paths or are in the field-of-view for a percentage of time.

16. A non-transitory computer-readable medium storing instructions that, when executed by one or more processors of a splat generation system, cause the splat generation system to perform operations comprising:

presenting a three-dimensional (3D) model to a plurality of client devices;

tracking a path with which each client device of the plurality of client devices views the 3D model;

setting different priorities based on a first subset of different parts of the 3D model being viewed by more client devices and for longer durations than a second subset of the different parts of the 3D model in the path tracked for each client device of the plurality of client devices;

determining a third subset of the different parts that are in a field-of-view tracked for the plurality of client devices for a first amount of time, and a fourth subset of the different parts that are in the field-of-view tracked for the plurality of client devices for a second amount of time that is greater than the first amount of time;

generating a first set of splats that represent the 3D model with a first fidelity, wherein generating the first set of splats comprises:

defining a loss function with a first amount of loss prior to generating the first set of splats; and determining that the first set of splats generated according to the loss function with the first amount of loss represents an original encoding of the 3D model with the first amount of loss;

generating a second set of splats for the first subset of the different parts of the 3D model that have higher priorities than the second subset of the different parts of the 3D model, wherein the second set of splats represent the first subset of parts at a second fidelity that is greater than the first fidelity, and wherein generating the second set of splats comprises:

changing the first amount of loss defined for the loss function to a second amount of loss that is less than the first amount of loss prior to generating the second set of splats; and determining that the second set of splats generated with the loss function defined with the second amount of loss represents the first subset of the different parts in the original encoding of the 3D model with the second amount of loss;

performing a first iterative pass that generates a third set of splats to represent the third subset of the different parts and the fourth subset of the different parts at the second fidelity;

performing a second iterative pass that generates a fourth set of splats to represent the fourth subset of the different parts at a third fidelity that is greater than the second fidelity; and presenting the first set of splats and the second set of splats in response to a request for the 3D model.

* * * * *